April 5, 1960
J. V. HAMMOND
2,931,334
DRINKING CUP FOR CAGES
Filed Aug. 25, 1958
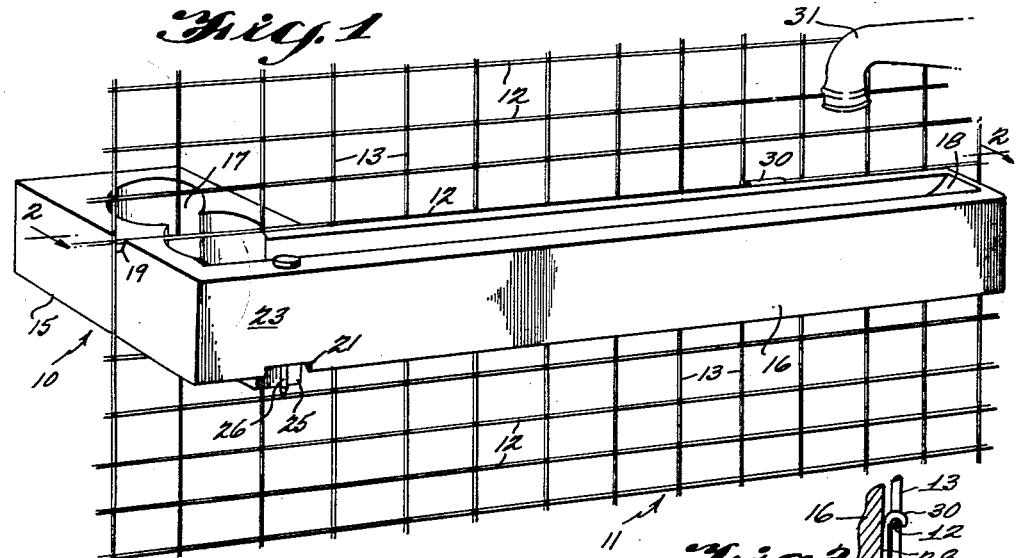
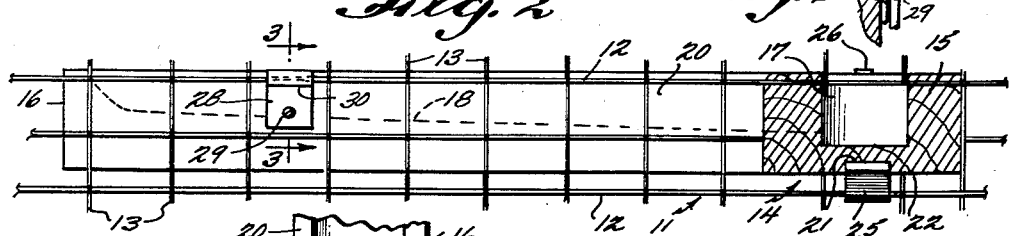
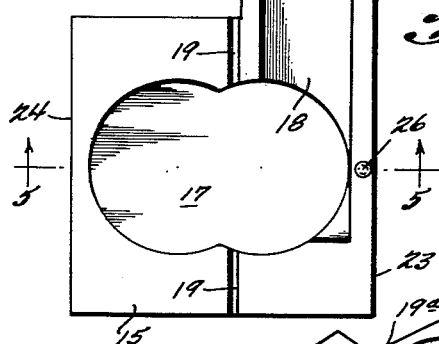
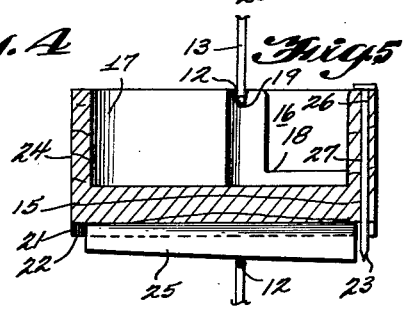
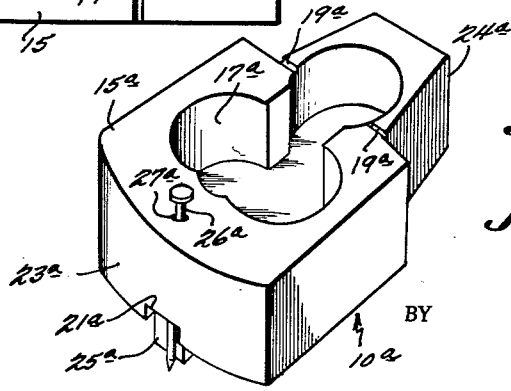
INVENTOR
JOHN V. HAMMOND
BY Kimmel & Crowell
ATTORNEYS

# United States Patent Office 2,931,334
Patented Apr. 5, 1960

2,931,334

DRINKING CUP FOR CAGES

John V. Hammond, Spangler, Pa.

Application August 25, 1958, Serial No. 756,888

2 Claims. (Cl. 119—18)

The present invention relates to drinking cups for cages, and particularly to removable drinking cups which can be readily detached for cleaning purposes.

The primary object of the invention is to provide a drinking cup removably secured to the wire mesh of a cage and extending therethrough to facilitate the filling of the cups from the exterior of the cage.

Another object of the invention is to provide a drinking cup of the class described above having a wedge for securing the cup to the wire mesh of the cage.

A further object of the invention is to provide a drinking cup of the class described above formed of wood and having an elongated filling trough formed on the exterior side thereof.

A still further object of the invention is to provide a drinking cup for cages of the class described above which is inexpensive to manufacture, simple to attach, and which provides a conveniently filled drinking attachment for cages.

Other objects and advantages will become apparent in the following specification when considered in the light of the attached drawings, in which:

Figure 1 is a perspective view of the invention.

Figure 2 is a vertical section taken along the line 2—2 of Figure 1, looking in the direction of the arrows.

Figure 3 is an enlarged fragmentary vertical section taken along the line 3—3 of Figure 2, looking in the direction of the arrows.

Figure 4 is an enlarged fragmentary top plan view of the invention.

Figure 5 is a fragmentary vertical section taken along the line 5—5 of Figure 4, looking in the direction of the arrows.

Figure 6 is a perspective view of a modified form of the invention.

Referring now to the drawings in detail wherein like reference characters indicate like parts throughout the several figures, the reference numeral 10 indicates generally a drinking cup constructed in accordance with the invention.

The drinking cup 10 is adapted for attachment to a cage, one wall of which is shown at 11 comprising a plurality of spaced apart parallel horizontally extending wires 12 having welded thereto a plurality of spaced apart parallel vertically extending wires 13. The wires 12 and 13 form a generally rectangular mesh, as best seen in Figure 1.

An opening 14 of generally rectangular form is provided in the wall 11 by removing a portion of one of the horizontal wires 12 and a portion of two of the vertical wires 13.

The drinking cup 10 includes a generally rectangular body 15 of a size to substantially fill the opening 14 in the wall 11 when extending therethrough. A generally rectangular elongated trough 16 is integrally formed on the body 15 and extends laterally from one end thereof, as can be seen in Figure 1.

The body 15 has a chamber 17 formed therein to provide a drinking reservoir and the trough 16 has a downwardly sloping bottom wall 18 which terminates at its lower end in the chamber 17 so that water therein will drain into the chamber 17. The body 15 has a groove 19 formed in the upper face thereof extending parallel to the trough 16 in substantially aligned relation to the inside edge 20 thereof.

A generally rectangular slot 21 is formed centrally of the lower surface 22 of the body 15 extending from the outer side 23 to the inner side 24. A wedge 25 is slidably seated in the slot 21 and is retained in place by a headed pin 26 which extends through a vertical bore 27 in the body 15 communicating with the slot 21 adjacent the outer wall 23.

A clip 28 is secured to the trough 16 at a point remote from the body 15 by means of a screw 29. The clip 28 has an inwardly projecting integral hook 30 formed on the upper end thereof to engage over a selected one of the horizontal wires 12.

In the use and operation of the invention, the groove 19 is positioned so as to encompass the lowermost wire 12 above the opening 14. The wedge 25 is then inserted between the uppermost wire 12 below the opening 14 and the slot 21 to support the body 15 with the groove 19 engaged with a wire 12.

The headed pin 26 is then dropped through the bore 27 to lock the wedge 25 in position so that the body 15 is supported on the cage 11. The clip 28 is positioned with its hook 30 engaged over a horizontal wire 12 to support the trough 16 in position.

The drinking cup 10 is used with the cage 11 mounted on a conveyor system (not shown) so that it can be moved past a stationary faucet 31 and be filled by water flowing from the faucet 31 into the trough 16 and thence into the reservoir 17.

In Figure 6 a modified form of the invention is illustrated wherein a drinking cup 10a has a body 15a including an open top reservoir 17a. A transverse groove 19a is formed in the upper wall of the body 15a to coact with one of the wires 12 of the cage front 11.

A generally rectangular slot 21a extends from the outer wall 23a to the inner wall 24a of the body 15a. A wedge 25a is slidably positioned in the slot 21a and secured therein by a headed pin 26a extending through a bore 27a which communicates with the slot 21a adjacent the outer wall 23a. The drinking cup 10a is mounted in the same manner as the drinking cup 10 and is used where the cages are stationary.

Having thus described the preferred embodiments of the invention, it should be understood that numerous structural modifications and adaptations may be resorted to without departing from the scope of the appended claims.

What is claimed is:

1. A drinking cup attachment for cages of the type including a plurality of horizontally extending wires and a plurality of vertically extending wires comprising a generally rectangular body having an open topped reservoir formed therein, said body having a transversely extending horizontal wire encompassing groove formed in the upper surface thereof, said body having a generally rectangular slot formed in the lower surface thereof perpendicularly to said groove, and means comprising an elongated wedge in said slot for engaging another of the horizontal wires of said cage to maintain said groove in encompassing relation to the first named horizontal wire.

2. A device as claimed in claim 1 wherein means are provided for maintaining said wedge in operating position in said slot.

References Cited in the file of this patent

UNITED STATES PATENTS

| 1,239,151 | Woods | Sept. 4, 1917 |
| 1,495,269 | Stewart | May 27, 1924 |
| 1,755,706 | St. George | Apr. 22, 1930 |